Nov. 29, 1960 G. R. OLIVER 2,961,997
ANIMAL GROOMING IMPLEMENT
Filed Dec. 9, 1958
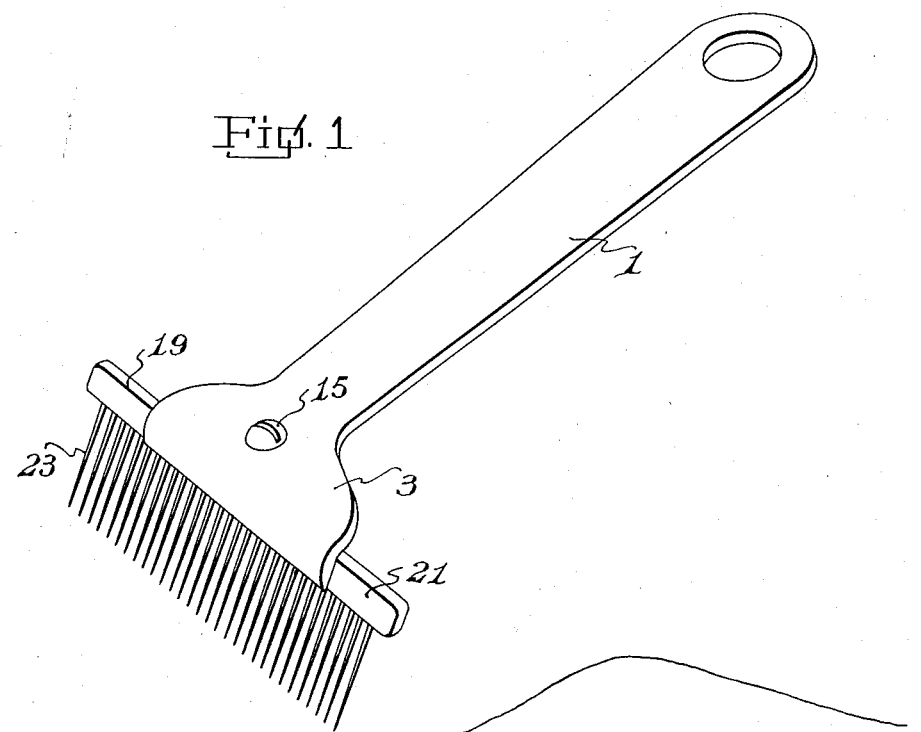
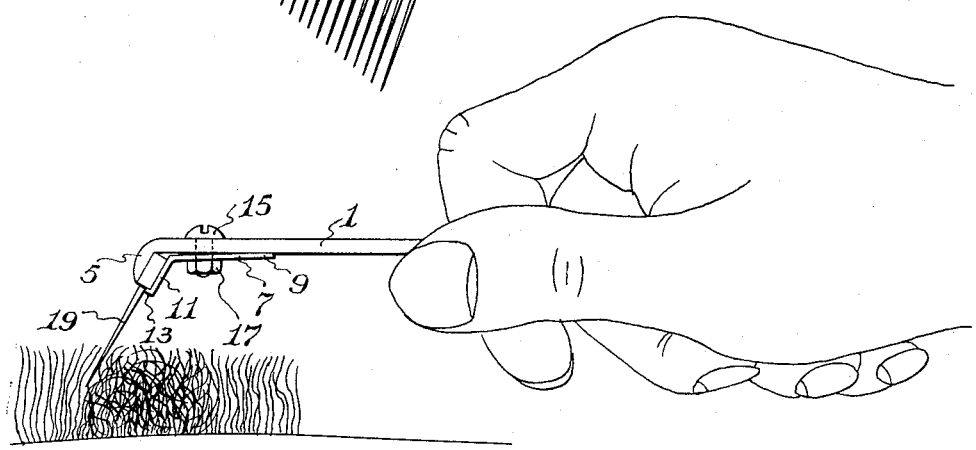
George R. Oliver
INVENTOR.
BY
ATTY

United States Patent Office 2,961,997
Patented Nov. 29, 1960

2,961,997

ANIMAL GROOMING IMPLEMENT

George R. Oliver, 220 N. Rosedale Ave., Tulsa, Okla.

Filed Dec. 9, 1958, Ser. No. 779,117

4 Claims. (Cl. 119—93)

The present invention relates to animal grooming implements, and more particularly to such implements of the comb type.

In the case of pet animals such as dogs, and particularly those having long hair, the problem of keeping the hair well combed presents considerable difficulty. Particularly when combing has been neglected for a while, the hair tends to ball and tangle and snarl to the point that it cannot be straightened with conventional tools now available. The only solution is to clip off all the hair or, in the case of a show dog, where this is obviously impossible, to cut the mat with scissors and then pick at it with a conventional comb until the cut and loosened hair is removed at the point of tangling.

These prior methods of working with animals' coats are time consuming and quite upsetting not only to the animal but also to the person performing the treatment. In the case of show dogs, for example, such treatment often renders the dog highly nervous and too upset for showing.

Accordingly, it is an object of the present invention to provide implements for quickly straightening out tangles and snarls in the coats of animals.

Another object of the present invention is the provision of implements in the nature of combs that will not pull or tug at the coat of an animal or otherwise cause the animal discomfort.

Finally, it is an object of the present invention to provide such implements that will be simple and inexpensive to manufacture, easy to operate and durable in use.

Other objects and advantages of the present invention will become apparent from a consideration of the following description, taken in connection with the accompanying drawings, in which:

Figure 1 is a perspective view of an animal grooming implement according to the present invention; and Figure 2 is a side elevational view of the implement of Figure 1 being used to straighten out a snarl in a dog's coat.

Referring now to the drawing in greater detail, there is shown an animal grooming implement in the nature of a comb, comprising an elongated handle 1 terminating at its forward end in an enlarged transverse head 3. At its forward edge, head 3 carries an elongated flange 5 disposed at an oblique angle to and transversely of the length of handle 1. Specifically, the under surface of flange 5 on the handle side thereof is uniplanar and is disposed at an oblique angle to the length of handle 1 as seen in Figure 2.

Releasably secured to handle 1 is a clamping member 7 comprising a base portion 9 disposed along the under side of the forward end of handle 1 and transverse head 3. Base portion 9 terminates at its forward end in a transversely extending elongated flange 11 parallel to and substantially co-extensive with flange 5. Disposed at right angles to flange 11 and extending toward flange 5 is a lip 13 integral with clamping member 7. A screw threaded fastener 15 extends through head 3 and base portion 9 and screw threadedly receives a locking nut 17 for releasably securing handle 1 and clamping member 7 together.

Releasably secured between handle 1 and clamping member 7, and more particularly between the opposed oblique surfaces of flanges 5 and 11, is a comb member 19 comprised of a straight, elongated bar 21 which is of rectangular cross-sectional configuration and to which are secured a plurality of elongated, tapered comb teeth 23, each of which tapers from its greatest thickness adjacent bar 21 to a relatively sharp point at its end opposite bar 21. Comb teeth 23 are parallel to each other and are disposed in a single row and lie in a common plane. The points of teeth 23 are disposed in a single straight line.

Bar 21 of comb member 19 is releasably clamped between flanges 5 and 11, and lip 13 fits under an edge of bar 21 to assure that comb member 19 will not slip forwardly from its seat. To this end, bar 21 is considerably thicker than the comb teeth 23 at their points of securement to bar 21, thereby to provide a retention shoulder on bar 21. Locking nut 17 is tightened or loosened from fastener 15 to enable insertion of bar 21 between flanges 5 and 11 or removal of bar 21 from between the two flanges, it being convenient simply to slip bar 21 lengthwise between the flanges or to loosen nut 17 sufficiently to permit bar 21 to be slipped over lip 13 and between the flanges. Upon tightening of nut 17, clamping member 7 resiliently bends sufficiently to assure that comb member 19 will be held rigidly to handle 1 with comb teeth 23 all disposed at an oblique angle of, for example, 120° to handle 1. In this way, replacement of worn comb members 19 is greatly facilitated.

In use, the implement is grasped by the handle and pulled in the direction teeth 23 lean, that is, toward the user. The comb teeth thus slide through the animal hair and the points of the teeth do not scratch the skin of the animal. When a snarl is encountered, the teeth tend to ride up over the snarl rather than to drag the hair of the snarl and cause discomfort to the animal. However, upon repeated combing of the snarl, the hairs of the snarl will be progressively disengaged from each other by the gentle carding effect of the comb; and ultimately the snarl will be straightened without the need for cutting or pulling.

In view of the above disclosure, it will be obvious that all of the initially recited objects of the present invention have been achieved.

Although the present invention has been described and illustrated in connection with preferred embodiments, it is to be understood that modifications and variations may be resorted to without departing from the spirit of this invention, as those skilled in this art will readily understand. Such modifications and variations are considered to be within the purview and scope of the present invention as defined by the appended claims.

What is claimed is:

1. An animal grooming implement comprising an elongated handle, the handle terminating at its forward end in an elongated flange disposed transversely of and at an oblique angle to the length of the handle, a clamping member releasably secured to the forward end of the handle, the clamping member having an elongated flange disposed transversely of and at substantially said oblique angle to the length of the handle and extending away from the handle in the same direction as the handle flange, and a comb member comprising an elongated bar and a plurality of slender comb teeth of a length substantially greater than the length of the bar and secured at right angles to the bar in a single row, means spaced from the bar and extending through the clamping member for releasably urging said flanges together, said bar being disposed between and in contact with said flanges and extending transversely of the length of the handle and the comb teeth extending at substantially said oblique angle to the length of the handle.

2. An animal grooming implement as claimed in claim 1, one of the flanges having a lip extending toward the other flange to retain the bar between the flanges.

3. An animal grooming implement as claimed in claim 1, the comb teeth being disposed in a single plane and the points of the comb teeth being disposed in a single line.

4. An animal grooming implement as claimed in claim 1, the bar being substantially thicker than the mean thickness of the comb teeth.

References Cited in the file of this patent

UNITED STATES PATENTS

| | | |
|---|---|---|
| 32,505 | Baldwin | June 11, 1861 |
| 532,564 | Kelly | Jan. 15, 1895 |
| 617,206 | Tveit et al. | Jan. 3, 1899 |
| 1,092,022 | Chilson | Mar. 31, 1914 |
| 2,030,183 | Rocquin | Feb. 24, 1933 |